US012060282B2

(12) United States Patent
Lee et al.

(10) Patent No.: US 12,060,282 B2
(45) Date of Patent: Aug. 13, 2024

(54) METHOD FOR PREPARATION OF PLATE-TYPE MANGANESE DIOXIDE NANOPARTICLES

(71) Applicant: LG CHEM, LTD., Seoul (KR)

(72) Inventors: Hosub Lee, Daejeon (KR); Seokhyun Yoon, Daejeon (KR); Byunggook Lyu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 291 days.

(21) Appl. No.: 16/646,098

(22) PCT Filed: Sep. 14, 2018

(86) PCT No.: PCT/KR2018/010863
§ 371 (c)(1),
(2) Date: Mar. 10, 2020

(87) PCT Pub. No.: WO2019/093648
PCT Pub. Date: May 16, 2019

(65) Prior Publication Data
US 2020/0207637 A1     Jul. 2, 2020

(30) Foreign Application Priority Data
Nov. 10, 2017   (KR) .................. 10-2017-0149678

(51) Int. Cl.
*C01G 45/02*     (2006.01)
*H01G 11/46*     (2013.01)

(52) U.S. Cl.
CPC ............. *C01G 45/02* (2013.01); *H01G 11/46* (2013.01); *C01P 2004/24* (2013.01); *C01P 2004/64* (2013.01)

(58) Field of Classification Search
None
See application file for complete search history.

(56) References Cited

U.S. PATENT DOCUMENTS

| 3,647,835 A | 3/1972 | Butter |
| 2013/0161570 A1 | 6/2013 | Hwang et al. |

FOREIGN PATENT DOCUMENTS

| CN | 102368555 A | 3/2012 |
| CN | 104275493 A | 1/2015 |
| JP | 2815611 B2 | 10/1998 |
| KR | 10-1999-015664 A | 3/1999 |
| KR | 10-0842295 B1 | 6/2008 |

(Continued)

OTHER PUBLICATIONS

KR_101262857_B1_I-Machine Translation (Year: 2013).*

(Continued)

*Primary Examiner* — Sheng H Davis
*Assistant Examiner* — Keling Zhang
(74) *Attorney, Agent, or Firm* — BRYAN CAVE LEIGHTON PAISNER LLP (57) ABSTRACT

A preparation method according to the present invention includes use of an amine-based coupling agent to prepare plate-type manganese dioxide nanoparticles. The plate-type manganese dioxide nanoparticles thus prepared can be suitably mixed with a carbon-based conductive material and are thus useful a positive electrode material for pseudo-capacitors.

4 Claims, 6 Drawing Sheets

(56) References Cited

FOREIGN PATENT DOCUMENTS

| KR | 10-2011-0095006 A | 8/2011 |
|---|---|---|
| KR | 10-2012-0079400 A | 7/2012 |
| KR | 10-2013-0072747 A | 7/2013 |
| KR | 10-1371288 B1 | 3/2014 |
| KR | 10-2017-0099797 A | 9/2017 |
| WO | 2007/006585 A2 | 1/2007 |

OTHER PUBLICATIONS

Machine translation of Seido et al., Jp 2815611B2 (Year: 1998).*

Bhattacharjee et al., Amino acid mediated synthesis of luminescent SnO2 nanoparticles, Journal of Industrial and Engineering Chemistry, 2015, 22, 138-146 (Year: 2015).*

Durupthy et al., Bioinspired synthesis of crystalline TiO2: Effect of amino acids on nanoparticles structure and shape, Crystal Growth & Design, 2007, 7, 12, 2696-2704 (Year: 2007).*

Khan, Zaheer, "MnO2 Nanostructures of Different Morphologies from Amino Acids-MnO4—Reactions in Aqueous Solutions", Colloids and Surfaces. B, Biointerfaces, 2010, 8, 1, 381-384.

Yang et al., "High Performance Graphene/Manganese Oxide Hybrid Electrode With Flexible Holey Structure", Electrochimica Acta. 129 (2014) 237-244.

Hang et al., "MnO2/Reduced Graphene Oxide Composite As High-Performance Electrode for Flexible Supercapacitors", Inorganic Chemistry Communications 30 (2013) 1-4.

Xia et al., "Nanoflaky MnO2/Carbon Nanotube Nanocomposites as Anode Materials for Lithium-Ion Batteries", J. Mater.Chem., 2010 (20) 6896-6902.

Li et al., "Facile Synthesis of MnO2/CNTs Composite for Supercapacitor Electrodes With Long Cycle Stability", J. Phys. Chem. C., 2014 (118) 22865-22872.

* cited by examiner

METHOD FOR PREPARATION OF PLATE-TYPE MANGANESE DIOXIDE NANOPARTICLES

The present application is a National Phase entry of International Application No. PCT/KR2018/010863 filed on Sep. 14, 2018, and claims priority to and the benefit of Korean Patent Application No. 10-2017-0149678 filed with the Korean Intellectual Property Office on Nov. 10, 2017, the entire content of which are incorporated herein by reference.

FIELD

The present invention relates to a method for the preparation of plate-type manganese dioxide nanoparticles.

BACKGROUND

Supercapacitors are a form of energy storage device, and their applications are expanding. Supercapacitors are characterized by a high charge/discharge rate and a long charge/discharge cycle life. Among supercapacitors, a pseudo-capacitor uses a metal oxide as a positive electrode material. Recently, many studies have been conducted due to the wide operating voltage range possessed by manganese dioxide.

In an attempt to increase the energy storage capacity per mass of the capacitor, studies have been frequently conducted to increase the surface area of the metal oxide. By the way, when forming nanoparticles with a zero dimensional (0D) structure while reducing the particle size of the metal oxide in order to increase the surface area, a large amount of conductive material is required, and the interfacial resistance between particles is increased. In addition, since manganese dioxide particles with a 1D structure basically have a tunnel-type crystal phase, if the crystallinity is increased, the entry and exit of ions can be carried out only in one direction, and thus the output characteristics may be deteriorated. To compensate for this, the method of attaching a small amount of manganese dioxide particles to a conductive material has a limit on the total energy density considering the weight of the conductive material.

On the other hand, studies have also been conducted to produce metal oxide particles in the form of spherical amorphous particles or unique shapes, but in most cases, the particles are grown by attaching to a conductive material, or the preparation method is complicated.

Accordingly, the present invention is directed to prepare plate-type manganese dioxide nanoparticles by using an amine-based coupling agent as described hereinafter and relates to plate-type manganese dioxide nanoparticles that can be suitably mixed with a carbon-based conductive material and are thus useful as a positive electrode material for pseudo-capacitors.

SUMMARY

It is an object of the present invention to provide a method for the preparation of plate-type manganese dioxide nanoparticles.

It is another object of the present invention to provide plate-type manganese dioxide nanoparticles prepared by the preparation method.

It is yet another object of the present invention to provide a positive electrode for redox capacitors including the plate-type manganese dioxide nanoparticles.

In order to achieve the above objects, one embodiment of the present invention provides a method for the preparation of plate-type manganese dioxide nanoparticles including the steps of adding an amine-based coupling agent to an aqueous solution containing a manganese salt to react them (e.g., step 1); and adding an oxidizing agent to the product of step 1 to react them (e.g., step 2).

DETAILED DESCRIPTION

Hereinafter, embodiments of the present invention will be described in detail for each step.

Adding an Amine-Based Coupling Agent to an Aqueous Solution Containing a Manganese Salt to React Them (e.g., Step 1)

Step 1 is a step of reacting a manganese salt with an amine-based coupling agent, thus causing the manganese dioxide to be prepared finally to have plate-like shapes.

The amine-based coupling agent used in step 1 causes the manganese dioxide nanoparticles to have plate-like shapes through bonding with manganese ions. Preferably, the amine-based coupling agent may contain one amine group and may contain about one carboxyl group or thiol group. The amine group is for binding with manganese ions, and in the case of two or more amine groups, there is a problem that the binding with manganese ions is strong and the production yield of manganese dioxide is deteriorated.

Preferably, the amine-based coupling agent is a compound represented by the following Chemical Formula 1:

[Chemical Formula 1]

in Chemical Formula 1,
$R_1$ is a natural amino acid residue, and
$R_2$ is COOH, or $CH_2SH$.

In Chemical Formula 1, the "natural amino acid residue" means a structure excluding the structure of $NH_2$—CH—COOH from the chemical structure of a natural amino acid. For example, when the natural amino acid is glycine, the natural amino acid residue means hydrogen. When the natural amino acid is aspartic acid, the natural amino acid residue means —CH$_2$COOH. When the natural amino acid is cysteine, the natural amino acid residue means —CH$_2$SH.

Preferably, the amine-based coupling agent is glycine, aspartic acid, cysteamine, cysteine, glutamic acid, selenocysteine, alanine, valine, isoleucine, leucine, methionine, or phenylalanine.

The molar ratio of the manganese salt and the amine-based coupling agent is preferably 1:0.5 to 2. When the molar ratio is less than 0.5, the effect due to the addition of the amine-based coupling agent is insignificant. When the molar ratio is greater than 2, the amount of the amine-based coupling agent added is too large, so that the effect due to excess coupling agent does not appear, and rather the yield is lowered.

Preferably, the manganese salt used in step 1 is Mn(CH$_3$COO)$_2$, or MnSO$_4$.

Meanwhile, it is preferable to perform the reaction by adjusting the pH to 7 or more in the reaction of step 1 as necessary. To this end, a basic material such as NaOH or KOH may be added during the reaction in step 1, Preferably, the pH can be adjusted to 8 or more, 9 or more, or 10 or more.

The reaction time of step 1 is not particularly limited, but it is preferably 5 minutes to 1 hour. When the reaction time is less than 5 minutes, the reaction of step 1 is not sufficiently progressed. When the reaction time exceeds 1 hour, the reaction is not substantially further progressed.

In addition, the reaction temperature of step 1 is not particularly limited, but is preferably 10° C. to 50° C., and more preferably the reaction can be carried out at room temperature.

Adding an Oxidizing Agent to the Product of Step 1 to React Them (Step 2)

Step 2 is a step of finally preparing plate-type manganese dioxide nanoparticles by adding an oxidizing agent to the product of step 1 to react them.

As the oxidizing agent, K$_2$S$_2$O$_8$, Na$_2$S$_2$O$_8$, or (NH$_4$)$_2$S$_2$O$_8$, may be used.

The amount of the oxidizing agent used is not particularly limited, but the molar ratio of the manganese salt and the oxidizing agent used in step 1 is preferably 2 to 10. When the molar ratio is less than 2, there is a fear that the effect due to the use of the oxidizing agent is insufficient. When the molar ratio is greater than 10, the reaction effect is not substantially further increased.

The reaction time of step 2 is preferably 2 hours to 12 hours. When the reaction time is less than 2 hours, the reaction of step 2 is not sufficiently progressed. When the reaction time exceeds 12 hours, the reaction is not substantially further progressed.

In addition, the reaction temperature of step 2 is not particularly limited, but is preferably 10° C. to 50° C., and more preferably the reaction can be carried out at room temperature.

Plate-Type Manganese Dioxide Nanoparticles

Another embodiment of the present invention provides plate-type manganese dioxide nanoparticles prepared by the preparation method described above. Since the plate-type manganese dioxide nanoparticles have a large surface area, they can be mixed well with carbon-based conductive materials, such as carbon black, or carbon nanotubes. When there is a 1D material such as carbon nanotube in the preparation process, some manganese dioxide can be attached to the surface of carbon, and naturally mixed with carbon nanotubes.

Yet another embodiment of the present invention provides a positive electrode for pseudo-capacitors including the plate-type manganese dioxide nanoparticles. The positive electrode for pseudo-capacitors may further include a carbon-based conductive material, for example, carbon black and carbon nanotubes, in addition to the plate-type manganese dioxide nanoparticles.

As in the following examples, when the plate-type manganese dioxide nanoparticles prepared according to the present invention are used for the preparation of a positive electrode for pseudo-capacitors, it is effective in increasing the specific capacitance.

As described above, the preparation method according to the present invention is to prepare plate-type manganese dioxide nanoparticles using an amine-based coupling agent, and the plate-type manganese dioxide nanoparticles prepared thereby can be suitably mixed with a carbon-based conductive material, and thus can be effectively used as a positive electrode material of a pseudo-capacitor.

EXAMPLES

Hereinafter, preferred examples will be presented to facilitate understanding of the present invention. However, these examples are provided for a better understanding of the present invention only, and are not intended to limit the scope of the invention.

Example 1

Step 1

2 mmol of Mn acetate and 20 mL of water were put into a reaction vessel, and 4 mmol of glycine was added thereto. Then, 5 g of NaOH and 50 mL of water were added and reacted with stirring at room temperature for 30 minutes.

Step 2

To the product of step 1, 1.6 g of K$_2$S$_2$O$_8$ and 50 mL of water were further added and the mixture was further reacted at room temperature for 12 hours to prepare a plate-type manganese dioxide.

Example 2

Step 1

40 mg of CNT, 2 mmol of Mn acetate and 20 mL of water were put into a reaction vessel, and 4 mmol of glycine was added thereto. Then, 5 g of NaOH and 50 mL of water were added and reacted with stirring at room temperature for 30 minutes.

Step 2

To the product of step 1, 1.6 g of K$_2$S$_2$O$_8$ and 50 mL of water were further added and the mixture was further reacted at room temperature for 12 hours to prepare a plate-type manganese dioxide.

Example 3

A plate-type manganese dioxide was prepared in the same manner as in Example 2, except that cysteamine was used instead of glycine.

Comparative Example 1

A solution in which 0.5 mmol of $KMnO_4$, 0.2 mL of formaldehyde, and 35 mL of water were mixed was put into a high-pressure reactor and reacted at 120° C. for 10 hours. Then, manganese dioxide was produced by heating to 280° C. in air.

Comparative Example 2

A solution in which 3 mmol of $KMnO_4$, 0.5 mmol of $MnSO_4$, 40 mL of water, and 500 mg of NaOH were mixed was put into a high-pressure reactor and reacted at 160° C. for 12 hours to prepare manganese dioxide.

Comparative Example 3

A plate-type manganese dioxide was prepared in the same manner as in Example 2, except that sodium diethyldithiocarbamate was used instead of glycine.

Experimental Example 1

Figure 1:
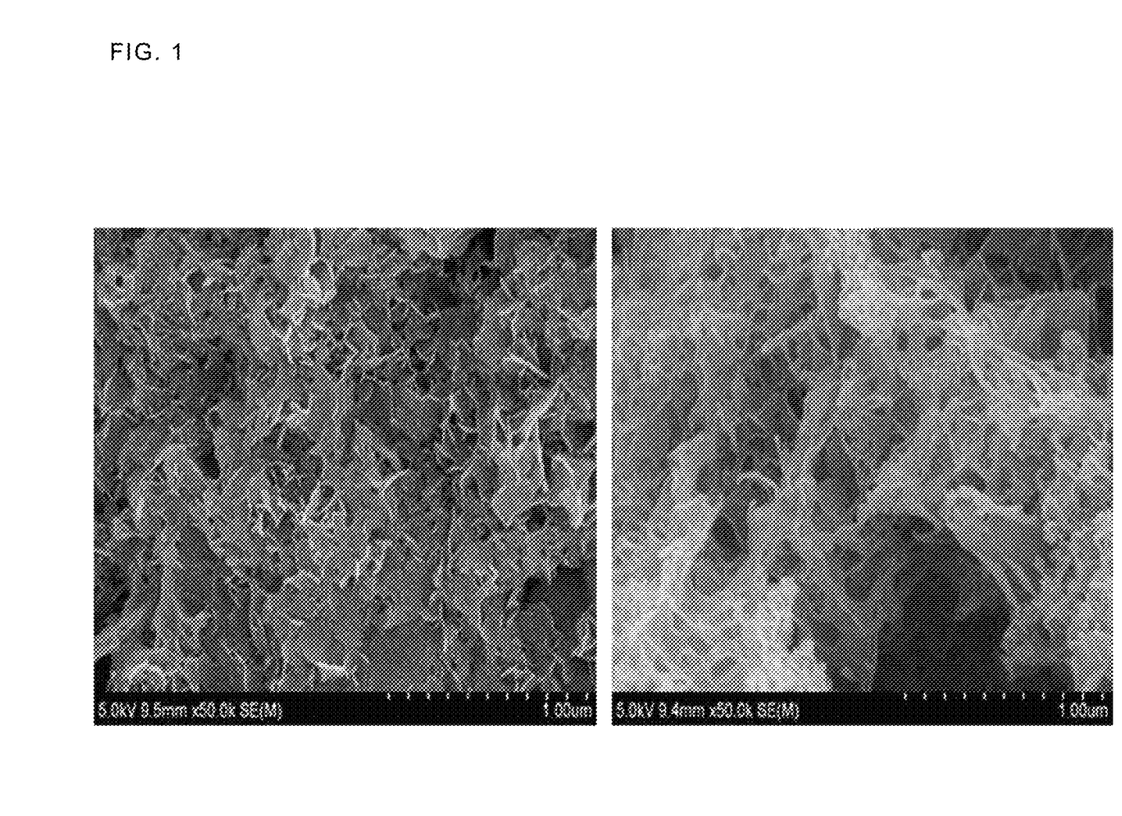
FIG. 1 shows an SEM image of the plate-type manganese dioxide nanoparticles prepared according to Example 1 of the present invention.
Figure 2:
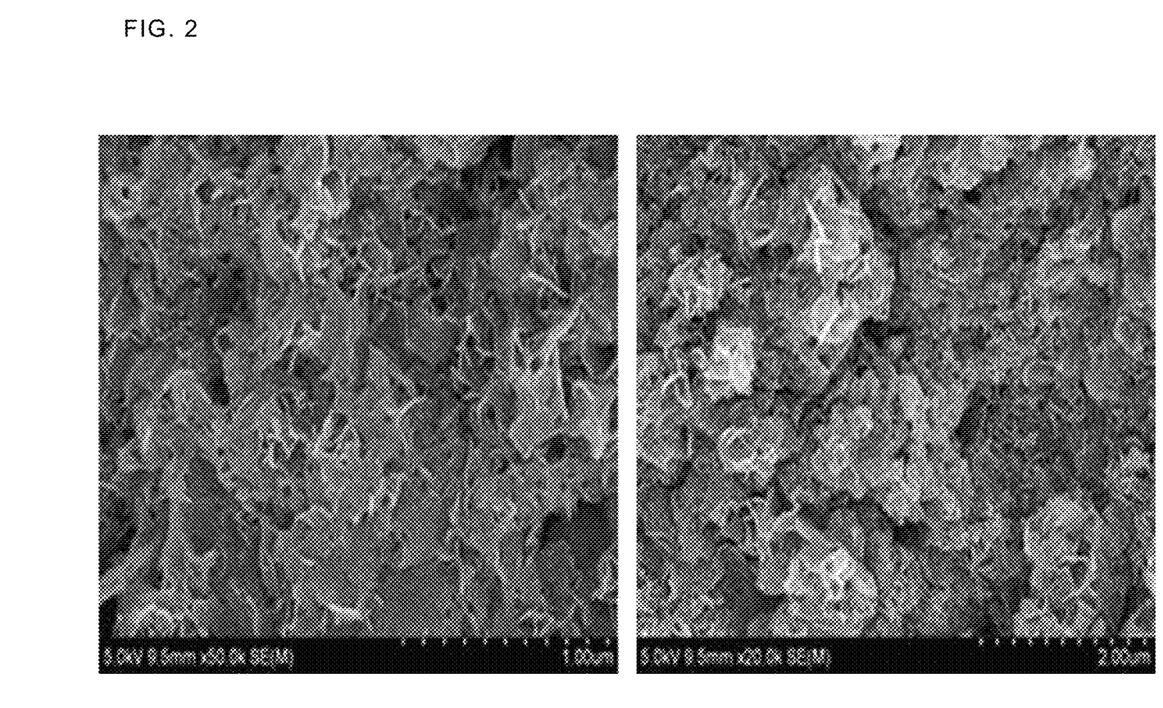
FIG. 2 shows an SEM image of the plate-type manganese dioxide nanoparticles prepared according to Example 2 of the present invention.
Figure 3:
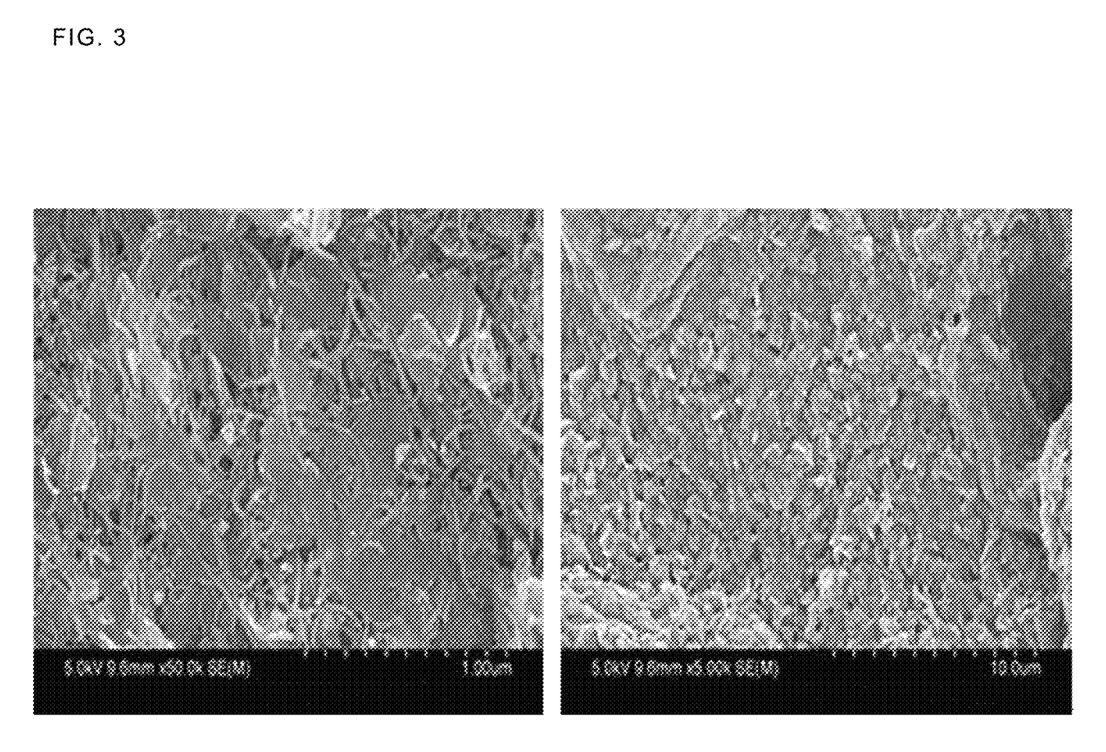
FIG. 3 shows an SEM image of the plate-type manganese dioxide nanoparticles prepared according to Example 3 of the present invention.
Figure 4:
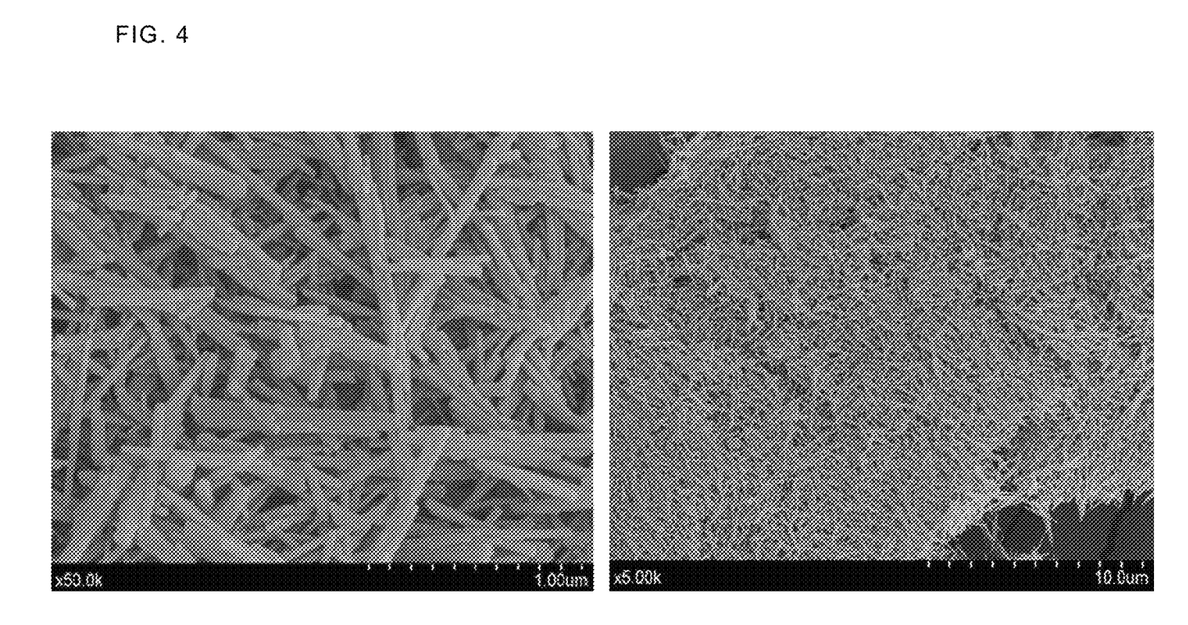
FIG. 4 shows an SEM image of the plate-type manganese dioxide nanoparticles prepared according to Comparative Example 1 of the present invention.
Figure 5:
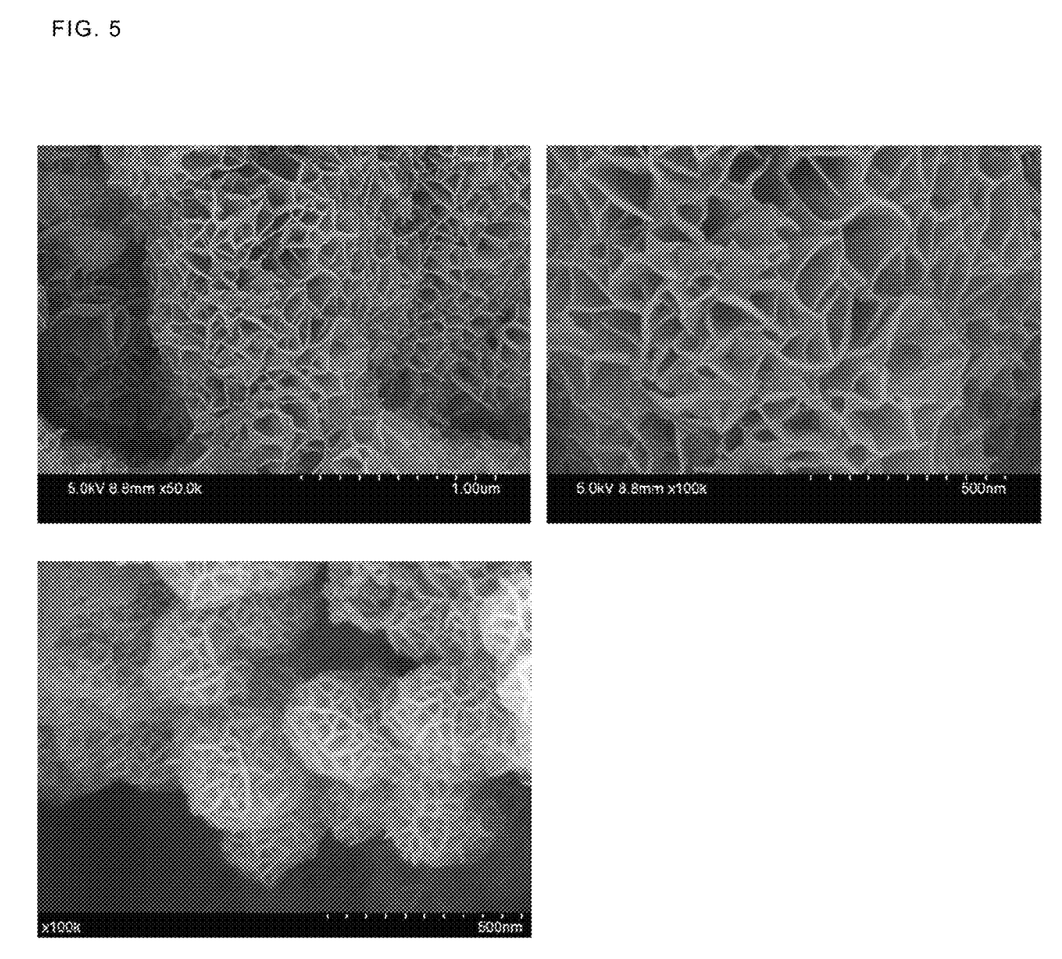
FIG. 5 shows an SEM image of the plate-type manganese dioxide nanoparticles prepared according to Comparative Example 2 of the present invention.
Figure 6:
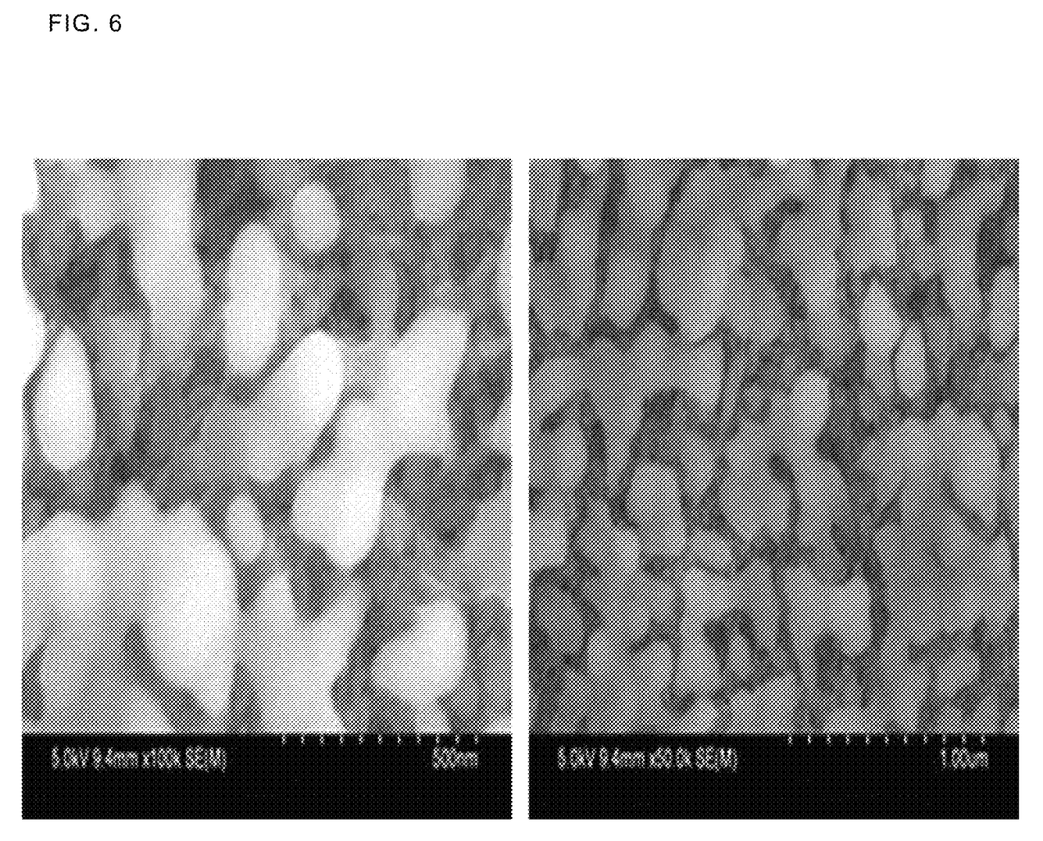
FIG. 6 shows an SEM image of the plate-type manganese dioxide nanoparticles prepared according to Comparative Example 3 of the present invention.

Manganese dioxides prepared in Examples and Comparative Examples were observed by SEM images, and the results are shown in FIGS. 1 to 6.
In Examples of the present invention, a plate-like shape was observed, whereas in Comparative Example 1, a needle-like shape was observed, and in Comparative Example 2, a honeycomb-like shape was observed. Further, in Comparative Example 3, particles having an unclear shape were synthesized.

Experimental Example 2

85 wt % of manganese dioxide prepared in Examples or Comparative Examples, 10 wt % of carbon black and 5 wt % of polyvinylidene fluoride (PVDF) binder were mixed. To 0.1 g of the mixed powder, 3.9 g of NMP was added to make a solution, which was added with 1 mm diameter $ZrO_2$ beads to a small glass vial and mixed using a 3D mixer. The ink was placed on a glassy carbon electrode and dried in vacuo, and then the specific capacitance was measured by cyclic voltammetry (CV) in a range of 0 to 1.0 V or 0 to 1.2 V in 1M $Li_2SO_4$ solution. The results are shown in Table 1 below.

TABLE 1

| | Example 1 | Example 2 | Example 3 | Comparative Example 1 | Comparative Example 2 |
|---|---|---|---|---|---|
| Specific capacitance | 250 F/g | 250 F/g | 200 F/g | 50 F/g or less | 150 F/g |

As shown in Table 1, in the case of Examples according to the present invention, it was confirmed that the specific capacitance is displayed larger than that of Comparative Examples.

The invention claimed is:
1. A method for the preparation of plate-shaped manganese dioxide nanoparticles comprising the steps of:
   reacting an amine-based coupling agent with an aqueous solution containing a manganese salt at a temperature of 10° C. to 50° C. for 5 minutes to 1 hour to form a reaction product, wherein the amine-based coupling agent is glycine, cysteamine, cysteine, selenocysteine, alanine, valine, isoleucine, leucine, methionine, or phenylalanine; and
   reacting an oxidizing agent with the reaction product for 2 to 12 hours to produce the plate-shaped manganese dioxide nanoparticles, wherein a molar ratio of the manganese salt to the oxidizing agent is 1:2 to 10.
2. The method of claim 1, wherein the manganese salt is $Mn(CH_3COO)_2$, or $MnSO_4$.
3. The method of claim 1, wherein a molar ratio of the manganese salt and the amine-based coupling agent is 1:0.5 to 2.
4. The method of claim 1, wherein the oxidizing agent is $K_2S_2O_8$, $Na_2S_2O_8$, or $(NH_4)_2S_2O_8$.

* * * * *